Feb. 13, 1940.  W. VAN. B. ROBERTS  2,190,435
TUNING INDICATOR CIRCUITS
Filed June 27, 1936
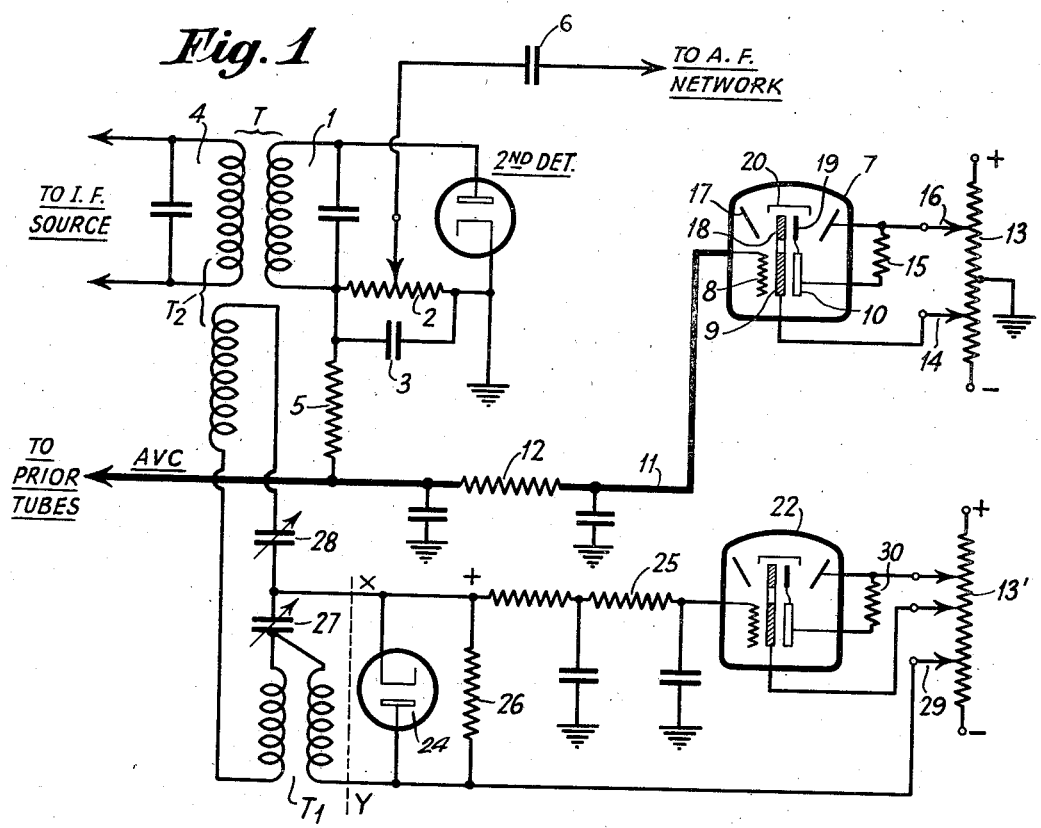
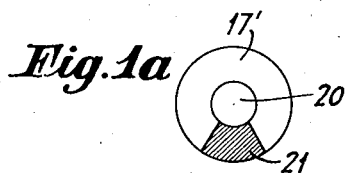
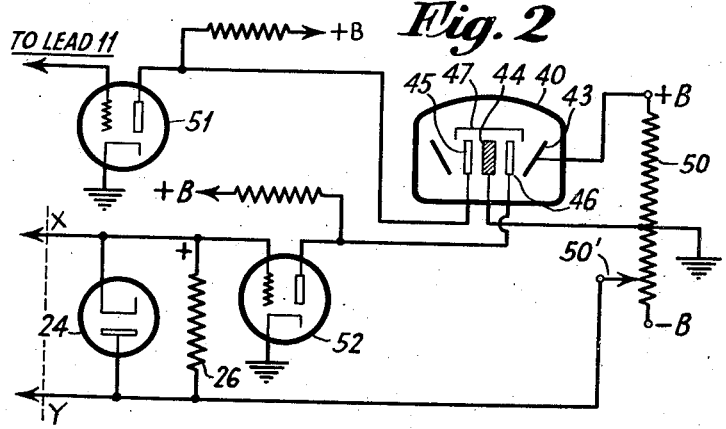
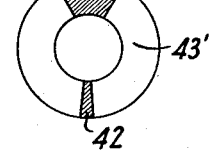
INVENTOR
WALTER VAN B. ROBERTS
BY
ATTORNEY Patented Feb. 13, 1940

2,190,435

UNITED STATES PATENT OFFICE 2,190,435

TUNING INDICATOR CIRCUITS

Walter van B. Roberts, Princeton, N. J., assignor to Radio Corporation of America, a corporation of Delaware Application June 27, 1936, Serial No. 87,607

11 Claims. (Cl. 250—40)

My present invention relates to tuning indicator circuits for radio receivers, and more particularly to tuning indicator circuits employing indicator tubes of the cathode ray type.

There has been disclosed by H. M. Wagner in application, Ser. No. 28,689, filed June 27, 1935, now issued as Patent No. 2,051,189 on August 18, 1936, a tuning indicator tube having a fluorescent electrode which is rendered luminous, and has the appearance of a pattern of light; the pattern, in general, being circular in shape, and having a dark space, or gap, in the luminous ring which increases in width upon departure of the receiving apparatus from resonance. As disclosed in the aforesaid patent, such an indicator tube is adapted for use in a radio receiver equipped with automatic volume control, and the indicator tube is known as a 6E5 type tube. In general, automatic volume control (AVC) voltage is employed automatically to regulate the width of the electrical shadow which is cast upon the fluorescent screen of the indicator tube.

Experience with this type of cathode ray indicator tube, in receivers equipped with AVC, demonstrates that it is not adapted to indicate the state of resonance of the receiver after the operator has been away from the receiver for a period of time. Since the width of the shadow cast upon the luminous screen of the indicator tube depends upon the signal strength at the receiver, a variation in signal strength may well be misinterpreted by the operator as a change in the state of tuning. For example, if the receiver is accurately tuned to resonance, and minimum shadow width is secured on the luminous screen of the indicator tube, a decrease in signal strength will cause a widening of the shadow of the indicator tube and cause the operator to believe that the set has become detuned.

Accordingly, it may be stated that it is one of the main objects of my present invention to provide tuning indication means for a radio receiver equipped with AVC, wherein the indicator means is, in general, of the aforesaid tuning indicator tube type, but wherein the operator may at any time observe the state of tuning of the receiver and know that the indication is independent of the received signal strength.

Another important object of this invention is to provide in addition to a tuning indicator of the cathode ray type which is constructed to produce a shadow width dependent upon signal strength, an auxiliary cathode ray tube indicator means which is constructed and arranged so that substantially no shadow will be produced if the receiver is in tune.

Still another object of the invention is to provide a single indicator tube of the cathode ray type, the tube being constructed to produce a pair of shadows on a luminous screen, and wherein the width of one shadow is determined by signal strength, and the width of the other shadow is responsive chiefly to the resonance condition of the receiver.

The novel features which I believe to be characteristic of my invention are set forth in particularity in the appended claims; the invention itself, however, as to both its organization and method of operation will best be understood by reference to the following description taken in connection with the drawing in which I have indicated diagrammatically two circuit organizations whereby my invention may be carried into effect.

In the drawing,

Fig. 1 is a circuit diagram of a portion of a superheterodyne receiver embodying one form of the present invention, Fig. 1a shows the appearance of the luminous screen of the indicator tube which indicates signal strength, Fig. 1b is a similar view of the luminous screen of the indicator tube which indicates solely the resonance condition of the receiver, Fig. 2 is a modified form of the invention, Fig. 2a shows the appearance of the luminous screen of the indicator tube of Fig. 2.

Referring now to the accompanying drawing, wherein like reference characters in the different figures designate similar elements, in Fig. 1 there is shown schematically that portion of a superheterodyne receiving system which is essential to an understanding of this invention. The second detector of the receiving system is shown as a diode, and its anode is connected to its grounded cathode through the I. F. input circuit 1 and the load resistor 2 arranged in series; the load resistor 2 being shunted by the I. F. by-pass condenser 3. The primary circuit 4 of the I. F. coupling transformer T is to be understood as being connected to the output of the first detector, or to the output circuit of the last I. F. amplifier. The circuits 4 and 1 are each resonated to the operating I. F., and those skilled in the art will understand that the usual superheterodyne receiver networks are to be employed ahead of circuit 4. Such networks comprise a signal collector which feeds a tunable radio frequency amplifier, and the latter feeding the first detector input circuit. A tunable local oscillator is also provided, and it is tunable over a frequency range which differs from the desired signal frequency range by a predetermined operating I. F. The latter may be chosen from a range of 175 k. c. to 450 k. c.

The direct current voltage developed across resistor 2 is used for AVC purposes, and the AVC lead is connected, through a filter resistor 5, to the anode side of load resistor 2. The AVC lead may be connected to any of the preceding signal transmission tubes in any manner well known to those skilled in this art. The audio voltage developed across resistor 2 is transmitted through condenser 6 to the audio frequency network, and the latter may be terminated by any desired type of reproducer.

The numeral 7 denotes in purely schematic manner a cathode ray tuning indicator tube of the 6E5 type. This type of tube has been disclosed and claimed in the aforesaid Wagner patent, and therefore it is believed sufficient to schematically represent the tube 7 as shown in Fig. 1. In general, the tube is provided with an envelope, in which is disposed an amplifier section, and a shadow-producing section. The amplifier section comprises the grid 8, the cathode 9, and the plate 10. The grid 8 is connected by the lead 11 to the anode side of the load resistor 2. The lead 11 may include therein a filter network 12 for suppressing the pulsating component in the direct current voltage developed across load resistor 2. Proper energizing potentials are supplied to the indicator tube 7 from a voltage supply bleeder resistor 13, an intermediate point of which is grounded; and the cathode 9 being connected in an adjustable manner, as by a tap 14, to a point between ground and the negative terminal of the resistor 13. The plate 10 may be connected through a resistor 15, and an adjustable tap 16, to a desired positive potential point on resistor 13 which is above ground.

The upper section of the indicator tube comprises a fluorescent screen, or conical anode, 17. The cathode 9 is provided with a second cathode section 18, the latter being spaced from the cathode section 9, but being maintained at the same direct current potential as the cathode 9. The interior surface of the anode 17 is coated with a material which becomes luminous when electrons from cathode 18 fall thereon. The control element 19 is spaced from cathode 18, but is arranged in parallelism therewith, and thus provides an electrical shadow at a portion of the luminous screen. The control element 19 is connected by a direct current connection to the plate 10, and it will assume a direct current potential which is equal to the direct current potential of the plate side of resistor 15. The numeral 20 denotes a cap positioned approximately as shown in Fig. 1, which gives to the eye of the person viewing the indication end of the tube the appearance of a luminous ring, and at the same time shields the eye from looking at the glowing cathode 18.

In Fig. 1a there is shown the appearance of the luminous screen of tube 7 when the shadow width is a maximum. This is the condition when the received signal strength is very weak or improperly tuned in. The shadow 21 varies in width inversely as the received signal strength. The luminous inner face 17' of anode 17 appears as a luminous annulus. As the direct current voltage impressed on grid 8 varies in magnitude, the width of shadow 21 will also change. This is explained by the fact that the voltage drop across resistor 15, with minimum signal amplitude impressed on circuit 1, is a maximum, and, therefore, the potential of control element 19 is at a minimum positive potential with respect to cathode 18. This means that the shadow width 21 is a maximum. However, as the signal amplitude at circuit 1 increases, the bias of grid 8 becomes more negative with the result that the voltage drop across resistor 15 decreases, and the control element 19 becomes more positive. This results in a decrease in the width of shadow 21. In this way it will be seen that the shadow 21 has its width inversely proportional to the received signal strength.

The indicator tube 7 need not have the amplifier section constructed as a triode, and this section may be of any other multi-electrode type. The cathode sections 9 and 18 are of the equipotential type, and the control element 19 may be a rod, or a vane shaped from sheet material, and placed edgewise to the cathode 18. The anode 17 surrounds, and is concentric with, the electron emitter 18, and is preferably shaped like a dish pan, with an inner coating 17' which becomes fluorescent under electron bombardment. The cap 20, positioned over the top end of cathode 18, further functions to confine the electrons, and prevents electrons from reaching the glass walls of the envelope over the top of anode 17. In this type of tuning indicator the electrons travel radially outward from the cathode to the fluorescent coating 17' on the anode in a wide beam. The extent of the surface of the anode reached by the electron beam is determined by the voltage on the electrode 19. The more positive this electrode 19 is with respect to anode 17, the greater is the area of the anode covered by the beam and the greater will be the area of the fluorescent portion of the anode.

A second cathode ray indicator tube 22, also of the 6E5 type, is provided in order to indicate primarily the resonance condition of the receiver. This tube is to be understood as being constructed exactly the same as tube 7. For this reason it is not believed necessary to provide any reference numerals on the electrodes of tube 22. The viewing portion of tube 22 is shown in Fig. 1b, and the shadow 23 thereof will be a minimum when the receiver is in tune. This action is secured by connecting the grid of the amplifier section of tube 22 to the cathode of diode rectifier 24 through a direct current potential connection including the pulsating component filter network 25; a load resistor 26 being connected between the cathode and anode of diode 24. The cathode and anode of diode 24 are connected in shunt across a circuit comprising the variable tuning condenser 27 and the secondary of transformer $T_1$. The I. F. signal energy is impressed across the circuit 28—27—$T_1$ by means of a transformer $T_2$.

The variable condenser 28 tunes the secondary of transformer $T_2$, the primary of $T_1$ and condenser 27 to resonance so as to provide a rapid voltage rise off resonance. The energizing potentials for tube 22 are derived from the voltage bleeder resistor 13', the diode anode end of resistor 26 being connected through an adjustable tap 29 to a point on resistor 13'. The cathode of the amplifier section of the indicator tube is connected to a point on the resistor 13' that is more positive than tap 29, and the fluorescent screen and amplifier plate of the tube 22 are connected to a still more positive potential point on the bleeder resistor, the amplifier plate circuit including resistor 30.

When correctly tuned signals are impressed on the circuit 27—T₁, the voltage transferred across this circuit to diode 24 will be substantially zero, since the reactance of condenser 27 is adjusted to be equal and opposite to the mutual reactance between the windings of T₁ at the operating I. F. In this case the voltage drop across resistor 26 is practically zero, and, therefore, the grid of the amplifier section of tube 22 will be negative. The voltage drop across resistor 30 will be a certain small amount depending on the position of tap 29, with the result that the shadow 23 will take on a desired normal width. However, as the I. F. energy impressed on the circuit 27—T₁ departs from the resonant frequency, then voltage begins to be impressed on diode 24 with the result that the cathode side of resistor 26 becomes more positive, and the direct current voltage drop across resistor 30 increases. This results in a widening of the shadow 23. If the operator leaves the receiver, and the signal amplitude should decrease due to fading, and the operator then returns to the set, he can immediately tell that the receiver is still in resonance, but that the signal strength has decreased. This follows from the fact that as long as the receiver is in resonance, the shadow 23 will be of its normal width, and only widens out when the receiver is detuned from the desired signal. Of course, it is possible to reverse the relation between shadow width and signal amplitude, or resonance, in the case of tubes 7 and 22. In other words, by reversing the phase of variation of the control voltages impressed on the grids of the amplifier sections of tubes 7 and 22, the shadow 21 of tube 7 may be caused to vary directly with signal strength, whereas the shadow 23 can be made to have a definite normal width which decreases when the receiver is detuned.

In Fig. 2, I have shown an indicator tube 40 which is adapted to produce the signal strength indication shadow and the resonance state shadow on one viewing screen. Thus, Fig. 2a shows the shadow 41 whose width is inversely proportional to signal strength, and the shadow 42 whose width is inversely proportional to the resonance condition of the receiver. Furthermore, the tube 40 does not utilize any amplifier sections, as in the case of tubes 7 and 22, but employs independent amplifiers, or phase reversal tubes. Thus, the tube 40 comprises the fluorescent anode 43 and the cathode 44. One control electrode 45 is disposed on one side of cathode 44, whereas the control electrode 46 is disposed on the other side thereof.

The cap 47 functions in the manner described in connection with cap 20, and the bleeder resistor 50 supplies the operating potentials for the various electrodes. The cathode 44 is connected to an intermediate ground point on resistor 50, and the luminous screen 43 is connected to the positive side of bleeder 50. The control electrode 45 is connected to the plate of the phase inversion tube 51, and the grid of the latter will be connected to the lead 11 of Fig. 1. The control electrode 46 is connected to the plate of the phase inversion tube 52, and the grid of the latter is connected to the cathode side of resistor 26 which as in the case of Fig. 1 is connected across the rectifier 24, the input of which is to be understood to be connected to the circuit appearing to the left of the line $x$—$y$ in Fig. 1. When a signal is tuned in the AVC bias on the grid of tube 51 will be a maximum; this means that the drop across the plate resistor is a minimum and the bias on electrode 45 is a minimum. Hence the shadow 41 will be very narrow, since the electrons from cathode 44 are not repelled. At the same time the drop across resistor 26 is zero, because at resonance the potential across 27—T₁ is zero. For this reason the tube 52 is biased to its maximum extent, and the voltage drop across the plate resistor of tube 52 is a minimum. Consequently the electrode 46 is not biased, and it does not repel electrons to produce a shadow. The minimum shadow width 42 is thus produced. If signal strength decreases due to fading the width of shadow 41 will increase, because the electrode 45 becomes negative. The shadow 42 will not change in width until the receiver is detuned, and potential appears across resistor 26 due to rectification of voltage across T₁—27 by rectifier 24.

The electrode 45 casts the shadow 41 on the luminous inner face 43' of anode 43, and this shadow becomes narrower as the received signal strength increases, as explained heretofore. On the other hand, electrode 46 produces the minimum shadow 42 regardless of signal strength when the receiver is in tune. Of course, the amplifying and phase inversion tubes 51 and 52 may be included in tube 40, if it is desired to have the tube 40 constructed in this manner. However, in order to preserve simplicity of construction in the case of tube 40, it is preferable to have the envelope include only the fluorescent screen, the cathode and the shadow producing rods. The potentials of the electrodes 45 and 46 determine the widths of the electrical shadows 41 and 42.

The signal intensity at which the shadow 21 in the circuit of Fig. 1 becomes zero may be adjusted by varying tap 14, or by varying tap 16. In the same way the normal shadow width at resonance may be adjusted for shadows 23 and 42 by varying the tap 29 in Fig. 1, or by varying the tap 50' in Fig. 2. Considering the operation of the circuits shown in Figs. 1 and 2, it has already been pointed out that there will be practically no shadows 23 or 42 when the receiver is exactly in tune to the desired signal. The shadows 21 and 41, however, will be of some width, varying with fading, or other cause of changing signal strength.

While I have indicated and described two systems for carrying my invention into effect, it will be apparent to one skilled in the art that my invention is by no means limited to the particular circuit organizations shown and described, but that many modifications may be made without departing from the scope of my invention as set forth in the appended claims.

What I claim is:

1. In a radio receiving system provided with a signal rectifier, means for employing the direct current voltage component of rectified signals as an automatic volume control bias, a cathode ray indicator tube which includes at least a cathode and a fluorescent anode, an electrode disposed in the indicator tube in such a manner that it is in the path of the electrons from the cathode to the anode, means responsive to said voltage component for varying the potential of said control electrode and thereby varying the width of an electrical shadow produced on the fluorescent anode, a second electrode disposed in the indicator tube, and means for varying the potential of said second control electrode chiefly in response to changes in the resonance condition of the receiver.

2. In a radio receiving system provided with a signal rectifier, means for employing the direct current voltage component of rectified signals as an automatic volume control bias, a cathode ray indicator tube which includes at least a cathode and a fluorescent anode, an electrode disposed in the indicator tube in such a manner that it is in the path of the electrons from the cathode to the anode, means responsive to said voltage component for varying the potential of said control electrode and thereby varying the width of an electrical shadow produced on the fluorescent anode, a second electrode disposed in the indicator tube, and means for varying the potential of said second control electrode chiefly in response to changes in the resonance condition of the receiver, said last means including a resonant circuit having substantially zero voltage output at resonance and rapidly increasing voltage output off resonance.

3. In a wave signaling system, an indicator tube provided with a cathode, a fluorescent anode surrounding the cathode, and a pair of control electrodes disposed in the electron stream from the cathode to the anode, said control electrodes being disposed on opposite sides of the cathode, means responsive to variations in wave amplitude for varying the direct current potential of one of said control electrodes and thereby varying the width of an electrical shadow produced on said anode by said one control electrode, and additional means responsive chiefly to a change in the resonance condition of the system for varying the direct current potential of the other control electrode thereby to provide a second electrical shadow on said anode.

4. In a wave signaling system, an indicator tube provided with a cathode, a fluorescent anode surrounding the cathode, and a pair of control electrodes disposed in the electron stream from the cathode to the anode, said control electrodes being disposed on opposite sides of the cathode, means responsive to variations in wave amplitude for varying the direct current potential of one of said control electrodes and thereby varying the width of an electrical shadow produced on said anode by said one control electrode, and additional means responsive chiefly to a change in the resonance condition of the system for varying the direct current potential of the other control electrode thereby to provide a second electrical shadow on said anode, said additional means including a resonant input network having substantially zero voltage produced thereacross at resonance.

5. In a wave signaling system, an indicator tube provided with a cathode, a fluorescent anode surrounding the cathode, and a pair of control electrodes disposed in the electron stream from the cathode to the anode, said control electrodes being disposed on opposite sides of the cathode, means responsive to variations in wave amplitude for varying the direct current potential of one of said control electrodes and thereby varying the width of an electrical shadow produced on said anode by said one electrode, additional means responsive chiefly to a change in the resonance condition of the system for varying the direct current potential of the other control electrode thereby to provide a second electrical shadow on said anode, said second means including an input circuit tuned to a desired wave frequency and having substantially zero voltage developed thereacross at resonance, and a rectifier adapted to produce said second direct current potential from alternating current voltage developed across said resonant input circuit off resonance.

6. In a radio receiver provided with a signal rectifier, means for employing the direct current voltage component of rectified signals as an automatic volume control bias, cathode ray indicator means capable of producing a pair of independent electrical shadows, means responsive to variations in automatic volume control bias for varying the width of one of said electrical shadows, and means responsive chiefly to changes in the resonance condition of the receiver for varying the width of the other electrical shadow.

7. In a radio receiver having a signal channel which includes a rectifier, means for deriving from the rectifier a direct current voltage capable of being utilized as an automatic volume control bias, means for visually indicating variations in said derived bias voltage, means for deriving from the signal channel a direct current voltage which varies chiefly with the resonance condition of the receiver, and means independent of the first visual indicating means for visually indicating variations in said last mentioned derived voltage.

8. The invention defined in claim 7 wherein each of the visual indicating means comprises a cathode ray indicator tube provided with a cathode, a ray-control electrode and a fluorescent anode, each of said derived voltages being applied to one of the ray-control electrodes of said cathode ray tubes.

9. The invention defined in claim 7 wherein said visual indicating means are included in a common cathode ray indicator tube which is provided with a cathode, a pair of ray-control electrodes and a fluorescent anode, each of said derived voltages being applied to one of said pair of ray-control electrodes.

10. In a wave signalling system, a pair of indicator tubes each provided with a cathode, a fluorescent anode surrounding the cathode and a ray-control electrode disposed in the electron stream between cathode and anode, means responsive to variations in wave amplitude for varying the direct current potential of the ray-control electrode of one of the indicator tubes and thereby varying the width of the electrical shadow produced on the anode of said indicator tube, and additional means responsive chiefly to a change in the resonance condition of the system for varying the direct current potential of the ray-control electrode of the other indicator tube thereby to provide an electrical shadow on the anode of said other indicator tube.

11. The invention defined in claim 10 wherein the additional means includes an input circuit sharply tuned to the operating frequency and has substantially zero voltage developed thereacross at resonance, and a rectifier adapted to produce said second direct current potential from alternating current voltage developed across said resonant input circuit off resonance.

WALTER VAN B. ROBERTS.